June 14, 1966  R. A. SOMMER  3,255,516
METHOD AND APPARATUS OF PRODUCING HEAT EXCHANGER TUBING
Filed Sept. 3, 1963
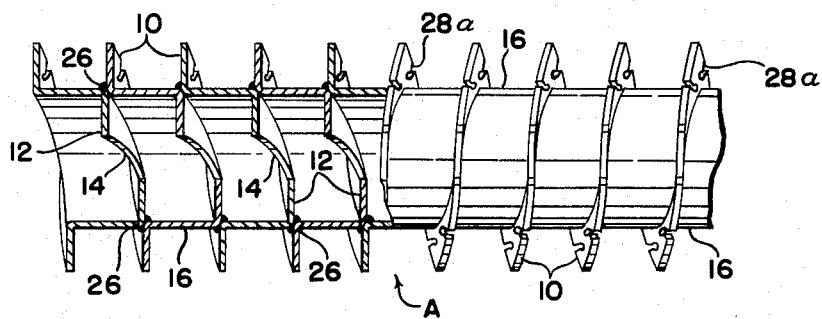
FIG. 1
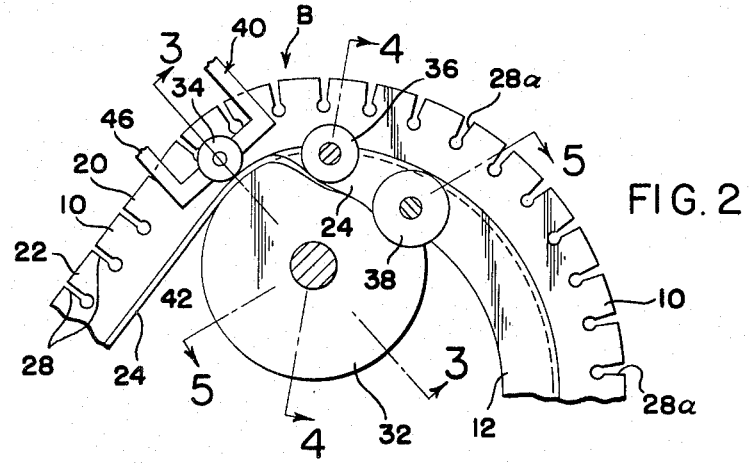
FIG. 2
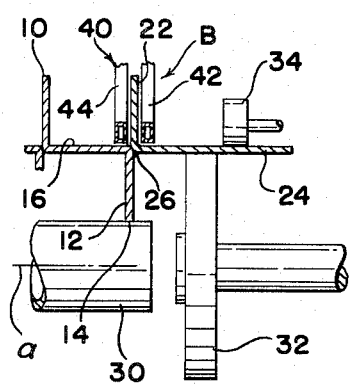
FIG. 3
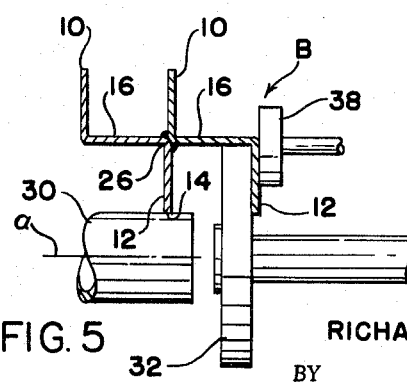
FIG. 4
FIG. 5
INVENTOR.
RICHARD A. SOMMER
BY
Tilberry & Body
ATTORNEYS United States Patent Office 3,255,516
Patented June 14, 1966

3,255,516
METHOD AND APPARATUS OF PRODUCING
HEAT EXCHANGER TUBING
Richard A. Sommer, Warren, Ohio, assignor to The Ohio Crankshaft Company, Cleveland, Ohio, a corporation of Ohio
Filed Sept. 3, 1963, Ser. No. 306,182
8 Claims. (Cl. 29—157.3)

The present invention pertains to the art of producing metal conduits and more particularly to the art of producing metal heat excanger tubing having both internal and external heat conducting fins.

In automotive radiators and other heat exchanger devices using conduits or tubing to carry the heat exchange fluid, it has become common practice to provide heat conducting fins extending radially inward from the inner surface of the tubing. These inwardly extending heat conducting fins substantially increase the heat conductivity between the inside and outside of the tubing; therefore, in such devices, tubing having both external and internal fins has substantially replaced the prior tubing having only external fins.

Various methods have been suggested for producing heat exchanger tubing having inwardly extending fins. In the past, the most commonly used of these methods included stamping a plurality of dish-shaped blanks from a thin strip of highly heat conductive metal, piercing central apertures in the blanks, stacking the blanks with their apertures aligned and, thereafter, welding the stacked blanks. The blanks were so contoured that, when stacked and welded, they formed a metal conduit having both outwardly and inwardly extending fins. Although such a method produced acceptable tubing, such tubing was relatively expensive. In addition, it was very difficult to obtain uniform results at the welded joint between the stacked blanks.

To overcome the obvious disadvantages of forming heat exchanger tubing by welding together a number of stamped blanks, it has been recently suggested that internally finned heat exchanger tubing could be produced by spirally winding a generally Z-shaped ribbon of thin, highly heat conductive metal around a mandrel with one leg of the Z-shaped ribbon extending inwardly and the other leg extending outwardly to produce inwardly and outwardly facing spiraled fins. As the ribbon converged with the mandrel carrying the tubing, it was welded onto the immediately preceding ribbon convolution so that a tubing was formed with one leg of the Z extending radially outward and the other leg of the Z extending radially inward. Although such a method produced a somewhat acceptable tubing, the energy necessary for forming the tubing was quite high because the outwardly extending fin was greatly stretched, even in some cases to the point of rupture, and the inwardly extending fin was greatly compressed. In addition, this stretching and compressing of the heat conductive fins caused internal stresses within the tubing which would often result in premature failure of the welded joint between adjacent convolutions of the thin metal ribbon.

These and other disadvantages have been completely overcome by the present invention which is directed toward a method and apparatus for producing a welded heat exchanger tubing formed from a spirally wound, metal ribbon which method and apparatus are economical to use and uniformly produce a sound tubing.

In accordance with the present invention there is provided a method of producing a heat exchanger tubing having internal and external fins comprising the steps of bending a thin strip of highly heat conductive metal into a generally L-shaped ribbon with the first and second angularly disposed legs, spirally winding the ribbon into a tubing having an axis with the ribbon approaching the tubing with the first leg generally perpendicular to the axis to form one of the fins and the second leg generally parallel to the axis to form the body of the tubing gradually bending the second leg radially in an opposite direction from the first leg until the cross-section of the ribbon is generally Z-shaped with the first leg forming the one fin of the tubing and the second leg forming the other fin and welding the apex of the incoming ribbon onto the corner formed by the bent second leg.

In accordance with another aspect of the present invention there is provided an apparatus for producing a heat exchanger tubing having internal and external fins comprising means for bending a thin, metal strip into a generally L-shaped ribbon with first and second angularly disposed legs; means for spirally winding the ribbon into a tubing having an axis with the ribbon approaching the tubing with the first leg generally perpendicular to the axis to form one of the fins and the second leg generally parallel to the axis to form the body of the tubing; means for gradually bending the second leg of the L-shaped ribbon to form a generally Z-shaped ribbon after the ribbon has been wound onto the tubing whereby the first leg forms one of the fins of the tubing and the second leg forms the other fin and means for welding the apex of the incoming ribbon onto the corner formed by the bent second leg.

The above described method and apparatus do not deform both the internal and external fins of the tubing at the same time; therefore, substantially less energy is required in spirally winding the ribbon into a tubing than was required when the ribbon was first formed into a Z-shape which necessitated simultaneous deformation of the internal and external fins.

The primary object of the present invention is the provision of a method and apparatus for producing an internally finned heat exchanger tubing from a spirally wound metal ribbon which method and apparatus are economical and produce a tubing with uniform high quality.

Another object of the present invention is the provision of a method and apparatus for producing an internally finned heat exchanger tubing from a spirally wound metal ribbon which method and apparatus require less energy to wind the ribbon into the tubing than was required with prior method and apparatus.

Still another object of the present invention is the provision of a method and apparatus for producing an internally finned heat exchanger tubing from a spirally wound metal ribbon which method and apparatus do not require substantial deformation of the ribbon as it is being wound into the tubing.

A further object of the invention is the provision of a method and apparatus for producing an internally finned heat exchanger tubing from a spirally wound metal ribbon which method and apparatus deform the metal ribbon forming the tubing after it has been spirally wound into the proper shape to form the tubing, with the subsequently deformed portion of the ribbon being the internal fin of the tubing.

These and other objects and advantages will become apparent from the following description used to illustrate the preferred embodiment of the present invention as read in connection with the accompanying drawing in which:

FIGURE 1 is a partially cross-sectioned side elevational view illustrating a heat exchanger tubing constructed in accordance with the present invention;

FIGURE 2 is an end view of the apparatus shown in FIGURE 3 and illustrating an apparatus constructed in accordance with the present invention; and FIGURES 3–5 are enlarged partial views illustrating the operating characteristics of the apparatus as shown in FIG. 2.

Referring now to the drawing, wherein the showings are for the purpose of illustrating a preferred embodiment of the present invention only and not for the purpose of limiting same, FIGURE 1 illustrates internally finned, heat exchanger tubing A of the type adapted for use in an automotive radiator or a similar heat exchanger device. The tubing A includes a spiral external fin 10 extending radially outward from the tubing A and a spiral internal fin 12 extending radially inward from the tubing. In order to provide a generally central fluid passage through tubing A there is included a central opening 14 generally concentric with the axially extending body portion 16 of the tubing A and defined by the internal fin 12. It is appreciated that this type of internally finned heat exchanger tubing can be used for various applications and the internal fin 12 greatly increases the heat conductivity from the inside of the tubing to the outside.

Referring now to FIGURE 2, there is disclosed an apparatus B for producing the internally finned heat exchanger tubing A shown in FIGURE 1. The tubing is formed from a generally L-shaped ribbon of thin, highly heat conductive metal, such as aluminum, which ribbon has a first leg 22 and a second leg 24 forming an apex 26 best shown in FIGURE 3. Prior to winding or reeling the ribbon into the spiral shape forming the tubing, the ribbon 20 is provided with a plurality of longitudinally spaced, transversely extending grooves 28. These grooves are adapted to be opened in the longitudinal direction as the leg 22 is being stretched when ribbon 20 is spirally wound into the shape of tubing A. The opened grooves 28 are indicated by numeral 28a in FIGURE 2.

In accordance with the preferred embodiment of the present invention, the apparatus B includes a mandrel 30 having an axis a which is generally concentric with the axis of the tubing A. This mandrel may be driven to wind or reel the ribbon 20 thereon or it may be stationary with the ribbon 20 being wrapped by an external means such as a pair of feed rolls. Neither of these winding devices are shown because they are common in the art of spirally winding or reeling thin, metal ribbon onto a mandrel to form metal tubing. Adjacent one end of mandrel 30 and substantially aligned with the point on the tubing at which the ribbon 20 tangentially converges with the tubing, there is provided a central forming wheel 32 adapted to bear against the underside of leg 24 in a manner best shown in FIGURES 3–5. Spaced axially from forming wheel 32 a distance substantially equal to the thickness of ribbon 20, there is provided another forming wheel 34 shown in FIGURE 3 which forming wheel 34 is adapted to coact with forming wheel 32 to align the ribbon 20 with the convolutions of the ribbon that have been previously wound onto the mandrel 30. The apex 26 of ribbon 20 contacts the previous convolution of tubing A as the ribbon approaches the tubing in a path generally tangential to the tubing A.

Circumferentially spaced from forming wheel 34 along the body portion 16 of tubing A is a forming wheel 36 which is substantially aligned with forming wheel 34 in a plane perpendicular to the axis a of mandrel 30 and tubing A. The forming wheel 36 is spaced radially inward a greater distance than the forming wheel 34 which spacing of the wheels tends to deform in an inward direction the leg 24 of ribbon 20 in a manner best shown in FIGURE 4. In FIGURE 5 there is shown another forming wheel 38 which is substantially in the same plane as forming wheels 34 and 36; however, the forming wheel 38 is spaced radially inward a substantial amount so that the leg 24 is deformed radially inward to produce the internal fin 12. It is appreciated that a number of forming wheels may be utilized for gradually deforming inwardly the leg 24 to form the internal fin 12. In addition, it is appreciated that various changes may be made in the means for deforming leg 24 into the radially inward extending fin 12 without departing from the intended spirit and scope of the present invention. By deforming the leg 24 after the ribbon 20 is wrapped onto the mandrel 30, substantially less energy is required during the winding operation which results in more uniform tubing having less residual stresses. In addition, the subsequent deformation of leg 24 is more easily accomplished than would be possible if the leg were deformed inwardly during the ribbon wrapping operation.

In operation of the apparatus B, as so far described, the metal ribbon 20 is spirally wound around mandrel 30 with the leg 22 extending substantially perpendicular to axis a and the leg 24 extending substantially parallel to axis a. The apex 26 of ribbon 20 and the body portion 16 at the outermost end of fin 12 are welded together to form a joint between the L-shaped ribbon 20 tangentially converging with the tubing and the previously wound convolutions of the tubing in a manner to be hereinafter described in detail. As ribbon 20 continues on its movement around the axis a, the forming wheels 34, 36 and 38 gradually deform the leg 24 until it is substantially parallel to leg 22 and forms the inwardly extending fin 12. After the fin 12 is formed, the cross-section of the ribbon 20 is Z-shaped to provide both internal and external fins for the tubing A.

While the ribbon 20 is being spirally wound onto the mandrel 30, the completed tubing A is shifted to the left as indicated by the arrow in FIGURE 3. Simultaneously with the winding operation, the tangentialy converging ribbon 20 is welded onto the convolution of tubing A which was immediately therebefore formed with the internal fin 12. A variety of apparatus could be provided for welding the ribbon onto the tubing A; however, in accordance with the preferred embodiment of the present invention, there is provided a high frequency inductor 40 driven by any appropriate power supply, not shown, and having a first leg 42 extending generally along the inner corner of the incoming L-shaped ribbon and a second leg 44 extending around the immediately preceding convolution of tubing A as is best shown in FIGURE 3. To form a complete circuit, legs 42, 44 are joined by an arch-shaped conductor 46 extending over the leg 22.

It is appreciated that the forming wheel 34 cannot be circumferentially spaced more than 360° from the point of convergence of the incoming ribbon 20 because the leg 24 must be at least partially deformed before the incoming ribbon is welded onto the body portion 16 as shown in FIGURE 3. In accordance with the preferred embodiment of the present invention, the whole deforming operation takes place within 360° from the point of convergence between the incoming ribbon and the tubing A. The inductor 40 extends along both the incoming ribbon 20 and the immediately preceding convolution of the tubing; therefore, this inductor preheats the apex 26 and the rearwardmost end of body portion 16 so that these two portions can be efficiently welded together when they converge.

It is appreciated that current flow in the ribbon and tubing could be provided by contacts sliding or rolling on both the body portion 16 and the ribbon 20 just in advance of the point of convergence between the incoming ribbon and the immediately preceding convolution of the tubing; however, the inductor 40 is believed to be more efficient and require less maintenance than such sliding or rolling electrical contacts.

The operation of apparatus B could be reversed with the L-shaped ribbon 20 first forming the internal fin 14 and, after welding the ribbon onto the tubing A, the ribbon could be gradually formed in a radial direction to produce the external fin 12.

The present invention has been discussed in connection with certain structural embodiments; however, various changes may be made in these structures without departing from the intended spirit and scope as defined in the appended claims.

Having thus described my invention I claim:

1. A method of producing heat exchanger tubing having internal and external fins comprising the steps of providing an L-shaped ribbon of highly heat conductive metal having two angularly disposed legs, spirally winding said ribbon into tubing having repeating convolutions with one of said legs being parallel to the axis of said tubing to form the body of said tubing and the other of said legs being perpendicular to said axis to form one of said fins gradually folding a portion of said parallel leg radially with respect to said tubing to form the other of said fins and then, welding the apex of the incoming ribbon onto the corner formed by the bent second leg.

2. A method of producing heat exchanger tubing having interinal and external fins comprising the steps of providing an L-shaped ribbon of highly heat conductive metal having two perpendicular legs, spirally winding said ribbon into tubing having repeating convolutions with one of said legs being parallel to the axis of said tubing and the other of said legs being perpendicular to said axis, welding said ribbon at the joint between said convolutions, and, after said welding, gradually folding a portion of said parallel leg toward said axis of said tubing to form the internal fin of said tubing.

3. A method of producing heat exchanger tubing having internal and external fins comprising the steps of providing an L-shaped ribbon of highly heat conductive metal having two perpendicular legs, spirally winding said ribbon into a tube having repeating convolutions with one of said legs parallel to the axis of said tubing and the other of said legs being perpendicular to said axis, welding said ribbon onto the immediately preceding convolution as it converges with said convolution, and, after said welding, gradually folding a portion of said parallel leg toward said axis of said tubing to form the internal fin of said tubing.

4. A method of producing heat exchanger tubing having internal and external fins comprising the steps of bending a thin strip of highly heat conductive metal into a generally L-shaped ribbon with first and second generally orthogonal legs, spirally winding said ribbon into tubing having an axis with said ribbon approaching said tubing while said first leg is generally perpendicular to said axis and said second leg is generally parallel to said axis, after said ribbon contacts said tubing in the winding step, welding said ribbon onto the tubing at the apex between the legs of said ribbon, and, before said L-shaped ribbon has been wrapped 360° around said tubing, gradually bending a portion of said second leg radially inward toward said axis of said tubing until the cross-section of said ribbon welded to said tubing is generally Z-shaped with the first leg forming the external fin for said tubing and the second leg forming the internal fin for said tubing.

5. An apparatus for producing heat exchanger tubing having internal and external fins comprising means for spirally winding an L-shaped ribbon into cylindrical tubing having an axis with said ribbon approaching said tubing with one leg generally perpendicular to said axis to form one of said fins and another leg generally parallel to said axis to form the body of said tubing means for gradually bending a portion of said other leg of said L-shaped ribbon to form said ribbon into a generally Z-shape cross section after the ribbon has been wound into said tubing whereby said one leg forms one of the fins of the tubing and the other leg forms the other fin and means for welding the apex of the incoming ribbon onto the corner formed by the bent second leg.

6. An apparatus as defined in claim 5 wherein said welding means includes an inductor and a high frequency power supply for driving said inductor, said inductor being positioned adjacent the point of convergence of said L-shaped ribbon and said tubing.

7. An apparatus as defined in claim 6 wherein said inductor has a first leg positioned between the legs of the incoming L-shaped ribbon and adjacent said point of convergence and a second leg positioned along the tubing and adjacent the point of convergence.

8. An apparatus for providing heat exchanger tubing having internal and external fins comprising means for bending a thin metal strip into a generally L-shaped ribbon with first and second generally orthogonal legs, means for spirally winding said ribbon into cylindrical tubing having an axis with said ribbon approaching said tubing while said first leg is generally perpendicular to said axis and said second leg is generally parallel to said axis, means for welding said spirally wound ribbon generally at the point of convergence of said ribbon and said tubing, and means for gradually bending a portion of said second leg of said L-shaped ribbon to form said ribbon into a generally Z-shaped cross-section after the ribbon has been welded onto said tubing whereby said first leg forms the external fin of the tubing and the second leg forms the internal fin of the tubing.

References Cited by the Examiner

UNITED STATES PATENTS

| 1,777,782 | 10/1930 | Bundy | 113—118 XR |
| 2,372,795 | 4/1945 | Rodeck | 113—118 |

FOREIGN PATENTS 1,088,912   9/1960   Germany.

WHITMORE A. WILTZ, *Primary Examiner.*

J. D. HOBART, *Examiner.*